3,786,006
MANUFACTURING METHOD FOR
POLYAMIDE FOAM

Toru Okuyama and Susumu Muta, Yokohama, Shigetake Sato, Kamakura, and Shohei Tokiura and Akira Miyasu, Hirakata, Osaka, Japan, assignors to Bridgestone Tire Company Limited, Tokyo, and Ube Industries Limited, Ube City, Yamaguchi Prefecture, Japan
No Drawing. Filed Oct. 6, 1972, Ser. No. 295,446
Claims priority, application Japan, Oct. 7, 1971, 46/78,330
Int. Cl. C08g 20/12, 53/10
U.S. Cl. 260—2.5 N         7 Claims

ABSTRACT OF THE DISCLOSURE

Method for manufacturing polyamide by polymerizing a lactam in the presence of a basic catalyst, a foaming agent, an N-chlorocarbonyl-2-chloro-2,3-dehydropolymethyleneimine compound in the amount ranging from $1/10$ to $1/1000$ mol per 1 mol of the lactam to be used and an aliphatic isocyanate compound in the amount ranging from $1/10$ to $1/1000$ mol per 1 mol of the lactam to be used. The temperature for carrying out the polymerization and the foaming must be above the melting point of the lactam and below the melting point of the resulting polymer. The advantage of the invention lies in that the reaction can be carried out simply in the ambient atmosphere and without necessity of removal of water during the reaction. The product foam mass has evenly distributed fine cell and is of satisfactorily low density.

---

The present invention relates to a method for manufacturing polyamide foam, and more particularly to such method by polymerizing a lactam in the presence of a basic catalyst and a foaming agent.

Recently various proposals have been made to produce polyamide foam by carrying out the polymerization of the lactam in the presence of the foaming agent and the basic catalyst, and further as occasion demands together with a co-catalyst.

These proposals, however, are all not satisfactory and have not yet been commercially manufactured due to the following fatal defects:

(1) Despite the fact that it is necessary to carry out the polymerization with foaming at a highly elevated temperature, at least 100° C., the reaction rate is too slow.

(2) Foaming efficiency is not so good and consequently low density polyamide foam cannot be obtained.

(3) Since it is necessary to carry out the reaction in the absence of water or in the atmosphere of inert gas, the operation is more or less troublesome.

(4) The surface region of the resulting foam mass is of low polymerization degree and consequently brittle.

It is thus an object of the invention to provide an improved method for manufacturing polyamide foam while avoiding and overcoming all of the defects referred to above.

This is made possible according to the invention by polymerizing a lactam in the presence of a basic catalyst, a foaming agent, an N-chlorocarbonyl-2-chloro-2,3-dehydropolymethyleneimine compound represented by the formula

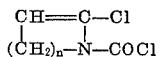

wherein $n$ is an integer of 2 to 10 in the amount ranging from $1/10$ to $1/1000$ mol per 1 mol of the lactam to be used, and an aliphatic isocyanate compound selected from the group consisting of hexamethylene diisocyanate, metaxylylene diisocyanate, hydrogenated diphenylmethane diisocyanate, and mixtures thereof in the amount ranging from $1/10$ to $1/1000$ mol per 1 mol of the lactam to be used, at a temperature above the melting point of said lactam and below the melting point of the polyamide to be produced.

Among the lactam materials to be used in this invention, there are γ-butyrolactam, δ-valerolactam, ε-caprolactam, enantholactam and dodecanolactam. Above all ε-caprolactam is preferable.

As the basic catalyst, any of the alkali metals, alkaline earth metals, hydroxides thereof, hydrides thereof, oxides thereof, carbonates thereof and reaction products of the lactam therewith may be used. Above all sodium caprolactam is preferable. The amount of the catalyst to be added is not critical but preferably ranges from $1/5$ to $1/500$ mol per 1 mol of the lactam material.

The dehydropolymethyleneimine has been used as cocatalyst, but this is not the entire role which said compound plays in the present invention, because said compound and the aliphatic isocyanate are both necessary for causing desired foaming. If either of said two compounds lacks, satisfactory foaming cannot be attained to be referred to and illustrated hereinafter. Among the N-chlorocarbonyl-2-chloro-2,3-dehydropolymethyleneimine to be used in the invention, there are:

N-chlorocarbonyl-2-chloro-2,3-dehydrotetramethyleneimine,
N-chlorocarbonyl-2-chloro-2,3-dehydropentamethyleneimine,
N-chlorocarbonyl-2-chloro-2,3-dehydrohexamethyleneimine,
N-chlorocarbonyl-2-chloro-2,3-dehydroheptamethyleneimine, and
N-chlorocarbonyl-2-chloro-2,3-dehydrododecamethyleneimine.

Said polymethyleneimine compound is used preferably in the amount ranging from $1/10$ to $1/1000$ mol per 1 mol lactam.

Among the aliphatic isocyanate compounds to be necessarily used together with said dehydropolymethyleneimine in the invention, there are hexamethylene diisocyanate, metaxylylene diisocyanate, hydrogenated diphenylmethane diisocyanate and mixtures thereof. Above all hexamethylene diisocyanate is preferable. The amount of said isocyanate compound preferably ranges from $1/10$ to $1/1000$ mol per 1 mol lactam.

As for the foaming agent, either volatile or decomposition types may be used. Among the former type agents are benzene, toluene, cyclohexane, ligroin, petroleum ether, pentane, hexane, heptane, octane and cyclooctane. Among the latter type agents are azodicarbonamide, azobisisobutyronitrile, and dinitroso pentamethylene tetramine.

The temperature for carrying out the polymerization and the foaming, of course, must be above the melting point of the lactam and below the melting point of the resulting polymer. The invention can be satisfactorily realized at any temperature between said lower and upper limits. In the case of ε-caprolactam, the corresponding polyamide foam can be produced in a very short time even at a temperature of 75° C. In comparison with the prior art methods for manufacturing polyamide foam from the lactam wherein the reaction temperature was at least 100° C., and preferably higher than 130° C., such a fairly low temperature would be highly appreciated by those skilled in the art together with very short time necessary for the polymerization with foaming. According to the present invention the reaction temperature ranges preferably from 70° C. to 170° C., and more preferably from 100° C. to 150° C. A further advantage of the invention lies in that the reaction can be carried out simply in the ambient atmosphere and without necessity of removal of water during the reaction. As occasion demands, it is possible to add a filler such as glass fiber, talc, organic and inorganic dyes and pigments without adversely affecting the foaming and polymerization. Finally, the product foam mass has evenly distributed fine cells and is of satisfactorily low density.

The invention shall be explained in more detail and the advantages thereof illustrated in more definitiveness in the following examples.

EXAMPLE 1

Dried ε-caprolactam was taken in the amount of 135.6 gr. in a flask in the nitrogen gas atmosphere to be melted, to which 4.6 gr. metal sodium was gradually added to prepare caprolactam comprising sodium caprolactam as basic catalyst in the amount of ⅕ mol per 1 mol caprolactam, from which as the first part 62 gr. was metered in a stainless beaker.

As the second part, 50 gr. ε-caprolactam, 4.3 gr. N-chlorocarbonyl - 2 - chloro - 2,3 - dehydrohexamethyleneimine, 3.7 gr. hexamethylene diisocyanate, 10 gr. toluene as foaming agent and 1 gr. silicone foam stabilizer SH–193 manufactured and marketed by Toray Silicone Company Ltd. in Japan were metered in another beaker.

Said first and second parts were mixed after heating up to 90° C. in the silicone bath. The mixture was agitated with a stirrer for about 15 seconds and then taken in a vessel. The foaming was commenced 5 seconds and ceased about 35 seconds, respectively after taking into the vessel.

The resulting mass was creamy colored hard polyamide foam of evenly distributed fine cells and 0.0520 gr./cm.$^3$ density.

EXAMPLE 2

The exact same experiment as in Example 1, except for omission of hexamethylene diisocyanate was carried out, but foaming hardly occurred.

EXAMPLE 3

The exact same first part of Example 1 and a second part similar to that in Example 2 except for use of 10 gr. xylene in lieu of 10 gr. toluene, were followed after respectively heating up to 130° C. The mixture was agitated with the stirrer for 10 seconds and then taken in the vessel. The foaming was immediately commenced and ceased after about 35 seconds.

The resulting mass had a hard shell with a large void therein, and was not such an article as could normally be called a foam product.

EXAMPLE 4

The exact same experiment as in Example 1 was carried out except for the omission of N-chlorocarbonyl-2-chloro-2,3-dehydrohexamethyleneimine, but foaming was hardly caused.

As will be appreciated from comparison of Example 1 with Examples 2 to 4, no satisfactory foam product could be obtained without use of the isocyanate and the dehydropolymethyleneimine compounds. Addition of said two compounds is thus a necessary condition for manufacturing polyamide foam from the lactam according to the invention.

EXAMPLES 5 TO 8

These experiments were carried out similarly to Example 1 but with varying the amount and kind of the foaming agent. In all these experiments satisfactory foam products could be obtained, with densities as indicated herebelow.

| Example | Foaming agent | | Density (gr./cm.$^3$) |
|---|---|---|---|
| | Kind | Amount (gr.) | |
| 5 | Toluene | 12 | 0.041 |
| 6 | do | 7 | 0.078 |
| 7 | do | 3 | 0.180 |
| 8 | Dioxane | 10 | 0.051 |

EXAMPLE 9

The exact same first and second parts in Example 1 were followed except that hexamethylene diisocyanate was used in the amount of 5.5 gr. in lieu of 3.7 gr.

Both parts were respectively heated up to 84° C. and mixed together. The mixture was agitated with the stirrer for about 15 seconds and then taken in the vessel. The foaming was commenced immediately and ceased after about 35 seconds.

The resulting mass was a hard polyamide foam of evenly distributed fine cells and 0.0505 gr./cm.$^3$ density.

EXAMPLE 10

Caprolactam comprising sodium caprolactam in the amount of ⅕ mol per 1 mol caprolactam was metered in the amount of 62 gr. as the first part in the stainless beaker. As the second part 50 gr. ε-caprolactam, 4.3 gr. N-chlorocarbonyl-2-chloro - 2,3 - dihydrohexamethyleneimine, 4.3 gr. metaxylylene diisocyanate available under the trade name of Takenate 500 and provided by Takeda Chemical Industries, Ltd., in Japan, 5 gr. toluene as foaming agent, and 1 gr. silicone foam stabilizer SH–193 were metered in another beaker. Said first and second parts were respectively heated up to 105° C. and mixed together. The mixture was agitated for about 15 seconds with the stirrer and then taken in the vessel. The foaming was commenced after 5 seconds and ceased after about 30 seconds.

The resulting mass was hard polyamide foam of 0.105 gr./cm.$^3$ density.

EXAMPLE 11

The exact same first and second parts as in Example 1 were prepared except that 2 gr. azodicarbonamide was used in lieu of 10 gr. toluene as foaming agent.

The both parts were respectively heated up to 90° C. and then mixed together. After agitation for about 15 seconds, the mixture was taken in the vessel. The foaming was commenced after 5 seconds and ceased after about 50 seconds.

The resulting mass was hard polyamide foam of fine cells and 0.189 gr./cm.$^3$ density.

EXAMPLE 12

As in Example 1, 128.1 gr. ε-caprolactam was reacted with 3.1 gr. metal sodium to prepare caprolactam comprising sodium caprolactam in the amount of 1/.75 mol per 1 mol caprolactam, from which 58 gr. was metered as the first part in the stainless beaker.

As the second part, 50 gr. ε-caprolactam, 2.85 gr. N-chlorocarbonyl - 2 - chloro - 2,3-dehydrohexamethyleneimine, 4.8 gr. hexamethylene diisocyanate, 10 gr. toluene as foaming agent, and 1 gr. silicone foam stabilizer SH–193 were metered in another beaker.

Said first and second parts were respectively heated up to 100° C. in the silicone bath and then mixed. The mixture was agitated with the stirrer for about 15 seconds and then taken in the vessel. The foaming was commenced after about 8 seconds and ceased after about 40 seconds.

The resulting mass was hard polyamide foam of evenly distributed fine cells and 0.0495 gr./cm.$^3$ density.

EXAMPLE 13

As in Example 1, 124.3 gr. ε-caprolactam was reacted with 2.3 gr. metal sodium to prepare caprolactam comprising sodium caprolactam in the amount of ⅒ mol per 1 mol caprolactam, from which 56 gr. was metered as the first part in the stainless beaker.

As the second part, 50 gr. ε-caprolactam, 2.0 gr. N-chlorocarbonyl 2-chloro-2,3-dehydrohexamethyleneimine, 5.5 gr. hexamethylene diisocyanate, 5 gr. xylene as foaming agent, and 1 gr. silicone foam stabilizer SH–193 were metered and mixed in another beaker.

Said first and second parts were respectively heated up to 115° C. in the silicone bath and then mixed together. The mixture was agitated with the stirrer for about 15 seconds to be taken in the vessel. The foaming was commenced after 10 seconds and ceased after about 30 seconds.

The resulting mass was hard polyamide foam of 0.154 gr./cm.³ density.

EXAMPLE 14

As in Example 1, 84.6 gr. caprylolactam was reacted with 2.3 gr. metal sodium to prepare caprolactam comprising sodium caprylolactam in the amount of ⅕ mol per 1 mol caprolactam, from which 61.6 gr. was metered and taken as the first part in the stainless beaker.

As the second part, 50 gr. caprylolactam, 3.5 gr. N-chlorocarbonyl - 2 - chloro - 2,3-dehydrohexamethyleneimine, 2.0 gr. hexamethylene diisocyanate, 1.0 gr. 2,4-tolylene diisocyanate, 5 gr. toluene as foaming agent, and 1 gr. silicone foam stabilizer, SH-193 were metered and taken in the separate beaker.

Said first and second parts were respectively heated up to 95° C. in the silicone bath and then mixed together. The mixture was agitated with the stirrer for about 15 seconds to be taken in the vessel. The foaming was commenced after 5 seconds and ceased after about 35 seconds.

The resulting mass was hard polyamide foam of evenly distributed fine cells and 0.160 gr./cm.³ density.

In the disclosure above, all examples have been given in respect of the methods wherein the first and second parts are separately prepared and then mixed. Please note, however that this is merely for the convenience of the actual treatments in view of very short time for the polymerization and foaming. It is not always necessary to separately prepare the first part involving the basic catalyst in the invention.

What is claimed is:

1. Method for manufacturing polyamide foam by polymerizing a lactam in the presence of a basic catalyst, a foaming agent, an N-chlorocarbonyl-2-chloro-2,3-dehydropolymethyleneimine compound represented by the formula,

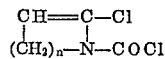

wherein $n$ is an integer of 2 to 10 in the amount ranging from ⅒ to ¹⁄₁₀₀₀ mol per 1 mol of the lactam to be used, and an aliphatic isocyanate compound selected from the group consisting of hexamethylene diisocyanate, metaxylylene diisocyanate, hydrogenated diphenylmethane diisocyanate, and mixtures thereof in the amount ranging from ⅒ to ¹⁄₁₀₀₀ mol per 1 mol of the lactam to be used, at a temperature above the melting point of said lactam and below the melting point of the polyamide to be produced.

2. Method as claimed in claim 1, in which said dehydropolymethyleneimine compound is N-chlorocarbonyl-2-chloro-2,3-dehydrohexamethyleneimine.

3. Method as claimed in claim 1, in which the foaming agent is selected from the group consisting of benzene, toluene, dioxane, trioxane, xylene, tetrahydrofuran, ethyl benzene, cyclohexane, cyclooctane, pentane, hexane, heptane, ligroin, petroleum ether, octane, and mixtures thereof.

4. Method as claimed in claim 3, in which the foaming agent is selected from the group consisting of toluene, dioxane, xylene, and mixtures thereof.

5. Method as claimed in claim 1, in which the foaming agent is selected from the group consisting of azodicarbonamide, azobisisobutyronitrile dinitroso pentamethylene tetramine and mixtures thereof.

6. Method as claimed in claim 5, in which the foaming agent is azodicarbonamide.

7. Method for manufacturing polyamide foam by polymerizing ε-caprolactam at a temperature ranging from 100° C. to 150° C. in the presence of a basic catalyst selected from the group consisting of sodium caprolactam, potassium caprolactam and mixtures thereof; a foaming agent selected from the group consisting of toluene, xylene, and dioxane; and N-chlorocarbonyl-2-chloro-2,3-dehydropolymethyleneimine compound selected from the group consisting of N-chlorocarbonyl-2-chloro-2,3-dehydrohexamethyleneimine, N - chlorocarbonyl-2-chloro-2,3-dehydrotetramethyleneimine, and mixtures thereof; and an aliphatic isocyanate compound selected from the group consisting of hexamethylene diisocyanate, metaxylylene diisocyanate, and mixtures thereof.

References Cited
UNITED STATES PATENTS

| 3,645,928 | 2/1972 | Wakamura | 260—2.5 N |
| 3,455,885 | 7/1969 | Oka | 260—2.5 N |
| 3,234,152 | 2/1966 | Fuller | 260—2.5 N |
| 3,498,956 | 3/1970 | Birkner | 260—78 L |

HOSEA E. TAYLOR, Primary Examiner

C. W. IVY, Assistant Examiner

U.S. Cl. X.R.

260—2.5 A, 78 L